United States Patent
Pretlove et al.

(10) Patent No.: US 8,126,964 B2
(45) Date of Patent: Feb. 28, 2012

(54) METHOD FOR DISPLAYING DATA IN AN INDUSTRIAL CONTROL SYSTEM

(75) Inventors: John Pretlove, Sandvika (NO); Stefan Svensson, Västerås (SE); Pierre Öberg, Västerås (SE); Mogens Mathiesen, Oslo (NO)

(73) Assignee: ABB Research Ltd., Zürich (CH)

( * ) Notice: Subject to any disclaimer, the term of this patent is extended or adjusted under 35 U.S.C. 154(b) by 461 days.

(21) Appl. No.: 11/667,710

(22) PCT Filed: Nov. 14, 2005

(86) PCT No.: PCT/SE2005/001727
§ 371 (c)(1),
(2), (4) Date: Dec. 4, 2007

(87) PCT Pub. No.: WO2006/052215
PCT Pub. Date: May 18, 2006

(65) Prior Publication Data
US 2008/0275971 A1 Nov. 6, 2008

(30) Foreign Application Priority Data
Nov. 14, 2004 (SE) ..................... 0402823

(51) Int. Cl.
*G06F 15/16* (2006.01)
(52) U.S. Cl. .................................... 709/204
(58) Field of Classification Search ............. 709/203, 709/220, 222, 204
See application file for complete search history.

(56) References Cited

U.S. PATENT DOCUMENTS

| | | | |
|---|---|---|---|
| 5,535,332 A * | 7/1996 | Ishida .................... | 709/205 |
| 5,975,737 A | 11/1999 | Crater et al. | |
| 6,092,078 A | 7/2000 | Adolfsson | |
| 6,195,091 B1 * | 2/2001 | Harple et al. ........... | 715/751 |
| 6,731,992 B1 | 5/2004 | Ziegler, Jr. | |
| 6,772,197 B1 | 8/2004 | Lee et al. | |
| 6,983,278 B1 * | 1/2006 | Yu et al. ................ | 1/1 |
| 7,003,550 B1 * | 2/2006 | Cleasby et al. ......... | 709/205 |
| 2002/0036990 A1 * | 3/2002 | Chodor et al. ......... | 370/262 |
| 2002/0065064 A1 * | 5/2002 | Griffith et al. ......... | 455/405 |
| 2002/0087220 A1 | 7/2002 | Tveit et al. | |
| 2002/0116453 A1 * | 8/2002 | Todorov et al. ........ | 709/203 |

(Continued)

OTHER PUBLICATIONS
PCT/ISA/210—International Search Report.

(Continued)

*Primary Examiner* — Faruk Hamza
*Assistant Examiner* — Jason Recek
(74) *Attorney, Agent, or Firm* — Venable LLP; Eric J. Franklin (57) ABSTRACT

A method to distribute or share data provided by a server process of an industrial control system to a client process running on a first machine of a first user, with a client process running on a machine of a second user. The server session is logged by the server process. It is determined that the first user makes a selection to distribute or share a client process with at least one second user. An address is retrieved for the at least one other user, and a channel is opened thus providing the same data provided to the client process running on the first machine to a client process running on a second machine of at least one second user. Also included are system, a human-machine interface and a computer program for carrying out the method.

37 Claims, 5 Drawing Sheets

U.S. PATENT DOCUMENTS

| | | | |
|---|---|---|---|
| 2002/0116489 A1 | 8/2002 | Davis | |
| 2003/0046398 A1* | 3/2003 | Buckley et al. | 709/227 |
| 2005/0138122 A1* | 6/2005 | Boehringer et al. | 709/205 |
| 2005/0251579 A1* | 11/2005 | Ngo et al. | 709/234 |
| 2010/0100632 A1* | 4/2010 | Qureshi et al. | 709/229 |
| 2010/0131584 A1* | 5/2010 | Johnson | 709/203 |

OTHER PUBLICATIONS

PCT/IPEA/409—International Preliminary Report on Patentability.
International-Type Search Report, dated Jun. 8, 2005, issued by the Swedish patent office in counterpart application No. 0402823-9.

* cited by examiner

METHOD FOR DISPLAYING DATA IN AN INDUSTRIAL CONTROL SYSTEM

CROSS-REFERENCE TO RELATED APPLICATIONS

This application claims priority to Swedish patent application 0402823-9 filed 14 Nov. 2004 and is the national phase under 35 U.S.C. §371 of PCT/SE2005/001727 filed 14 Nov. 2005.

TECHNICAL FIELD

The present invention is concerned with accessing and distributing technical data in a computerised system such as an industrial control system. In particular it is concerned with accessing and distributing data provided by a server process, such as a web server, to a client process. The invention is also advantageously applicable to small computing devices which may have relatively reduced display, memory and processing capabilities.

BACKGROUND ART

Ordinary computer systems and networked computers are often provided with technical support for application problems, network problems and so on by means of remotely located technical support specialists. Typically a remotely located Help Desk specialist may be contacted by phone, e-mail, intranet or the Internet etc. to assist with a problem of a computerised system. Certain software applications familiar to those skilled in the art of Local Area Networks (LANs) are readily available so that a technical specialist at a remotely located Help Desk may look at a display running on the problematic computer system and input selections or commands as though the specialist were present in person. However, such specialists are only be able to assist with problems related to a specific LAN. In addition, applications sometimes called "remote control" software such as PC anywhere (TM Symantec) may effectively copy and transmit screen images and keyboard inputs from a remote user, however this can also place high demands on communication bandwidth and processing power.

The security of remote connections is a challenging issue. One method to enable secure sharing between different machines has been the use of Virtual Private Networks, VPNs. However, for many organisations these have proved to be rather complex for ordinary pc users to configure and set up. VPNs have also required a considerable communication bandwidth to accommodate functions such additional layers required for security, as well as the data or payload elements. Such heavy requirements on bandwidth, and also on processing power, make such applications unsuitable for smaller or portable computing devices with reduced display, memory and processing capabilities that are available to users in an industrial installation.

SUMMARY OF THE INVENTION

The aim of the present invention is to remedy one or more of the above mentioned problems.

It is an aim of the invention to provide a system and method for a third party to provide maintenance service for an electrical power generation, transmission and distribution system to a Utility or other operator of a power system. This and other aims are fulfilled by the present invention according to a method and a system. In addition, further and advantageous aspects of the invention are provided by a graphical user interface, and a computer program and a computer program product.

In a first aspect of an embodiment of the invention a method for sharing data provided by a server process of an industrial control system to a client process running on a user machine of a first user, wherein the session is logged by said server process, and by the process of determining that said first user makes a selection to distribute or share said data of said client process with at least one second user, and by retrieving an address for the at least one other user, and by opening a channel and providing the same said data from said client process to a user machine of the at least one second user. The invention may be summarily or simply described as a means for communicating technical data provided by a server to a first client and distributing it to a client of a second or other user.

A first arrangement of an embodiment of the invention comprises two different users both accessing data provided by the same server, preferably a web server, from two different machines or workstations. Simply put this may be described to mean that web pages, for example, displayed by a client process and viewed by a first user may be automatically loaded on a client process for another user, so that each of the two users may examine the same page. Collaboration between different users is provided, enabled and supported by the invention in a way which requires a minimum of additional communication bandwidth and a minimum of additional computer programs. It may also be carried out largely independent of different device types, for example by using technical formats such as HTML or XML, XSL structured text documents and the like which may be converted to suit device based technical requirements into WAP or WSL, WDL or other formats. A particularly useful example of formatting and format conversion is to suit potentially limiting factors common with small, portable computer-equipped devices, PDAs, mobile phones and the like, technical factors such as display size, graphical resolution, available memory, available processing power.

The principle advantage of an embodiment of the present invention is that all the necessary information about what is shown on the client of the first user, which has already been handled at one time by the server, is therefore available for distribution, or for retrieval and distribution, making this information shown on a client screen of the first user to be shared and displayed to a display for one or more second users. The requirement for pre-installed software on the client may in practice be eliminated, as it is only a thin client such as a web browser client that is required. Software readily available on any computing platform in other words. Data is shared between users whilst minimising used network bandwidth and use of system resources (especially on the client). Bandwidth requirements are further reduced because the sharing may also preferably be carried out asynchronously.

In this embodiment of the invention data sharing between users is provided by means of reduced bandwidth requirements, no extra client software requirements, low use of system resources, and where the only additional device or resource required is means to access a session database from a server process or application according to another aspect of the invention, that enables asynchronous application sharing.

Data that is provided by the server process to a client process is logged. The same data can also be sent to another user at the same time, or retrieved and sent at a later time. This minimizes the traffic from the client/user and the workload on the client device.

Another advantage is that sharing is enabled for a device that may have limited computing resources, meaning for example limited communication bandwidth, limited processor power, limited graphics capability. Thus it is very suitable for a wireless setting employing various mobile devices, various computer-equipped devices, such as portable computers, PDAs, combined computing device/mobile telephone and the like, most of which are limited in their bandwidth, data storage capacity and amount of processing power available to handle extra applications and/or computer programs. Providing data and sharing data to such computer-equipped devices or phones is simplified by re-formatting the shared data where necessary to comply with technical requirements of a WAP browser or similar browser or thin client adapted for use on a small device or mobile phone.

This is a great advantage within the area of sharing data handled by an industrial control system. A first user may share information displayed on his computer or PDA etc with a second user, who may be a technical expert, a Help Desk person, a colleague and so on, so as to explore or discuss a technical issue concerning a device or process or product. In this way, technical assistance for monitoring or maintenance of devices or processes in an industrial installation may be more easily carried out, even in situations where the computing devices used in the field may have limited display, memory and processing power.

BRIEF DESCRIPTION OF THE DRAWINGS

A more complete understanding of the method and system of the present invention may be had by reference to the following detailed description when taken in conjunction with the accompanying drawings wherein:

FIG. 5 shows a schematic display with means to identify another user or users to share screens with;

DESCRIPTION OF THE PREFERRED EMBODIMENTS

A user in an industrial installation may require technical information from a technical specialist to assist him or her with a particular equipment or process or service. To obtain more technical information for an equipment or system a user can, by using the method and system of an embodiment of the invention, share the data displayed on his/her workstation with another person, in this example, contact a maintenance specialist, or other technical support specialist or manufacturers specialist. Thus a user, who may be any operator, technician, maintenance person, engineer or other authorised person in the industrial installation may require assistance in order to carry out a technical action including any of:

monitor a equipment, process or system,
inspect a maintenance or event log for an equipment or process,
produce a maintenance report generally,
produce a general operations report,
produce a maintenance report about a specific equipment, process or system,
analyse a report for a device, process or system,
analyse a report on a specific event or alarm,
produce a report on a specific event or alarm,
perform a diagnostic action for a device, equipment or system,
order service or spare parts,
configure a change in operational parameters or set-points,
perform a corrective action for an equipment or system.

The user, who is normally logged in to a data network and/or control system in the industrial installation, can share the information on his/her computer or workstation with another user in the following way:

a) A user opens a browser window and connects to a web server, starting a new session on the server, b) the user browses for and finds information which is provided by the server: the server logs the client session;

c) information is transmitted to the client application of the user, formatted to the client display by means of one or more indicators, d) all data that is sent to client of the user is logged on the server. The data logging is done through storing information about each session in a database. This information may comprise the time of access, pages visited, specific values of dynamic data given and the type of client (ie type of internet browser), and may comprise an indicator for display specifications or limitations or technical format requirements of a user machine, and;

e) The user decides to share the data with a second user, and activates a button, screen icon, keyboard command or similar to initiate a request to share with another user, f) The user indicates an identity for one or more second users, and may also indicate sharing privileges such as read, read/write;

g) the server side process receives the request to share and sends the data of the session to a client of the second user.

f) alternately or as well a server process may access the session database to retrieve the information given to a specific user client at that moment or at a specified previous time and send it to a new client.

The screen sharing principle relies on two or more clients (two or more computer program client processes running on a machine of each user) being enabled to connect to the same web server in a structured fashion.

Figure 1:
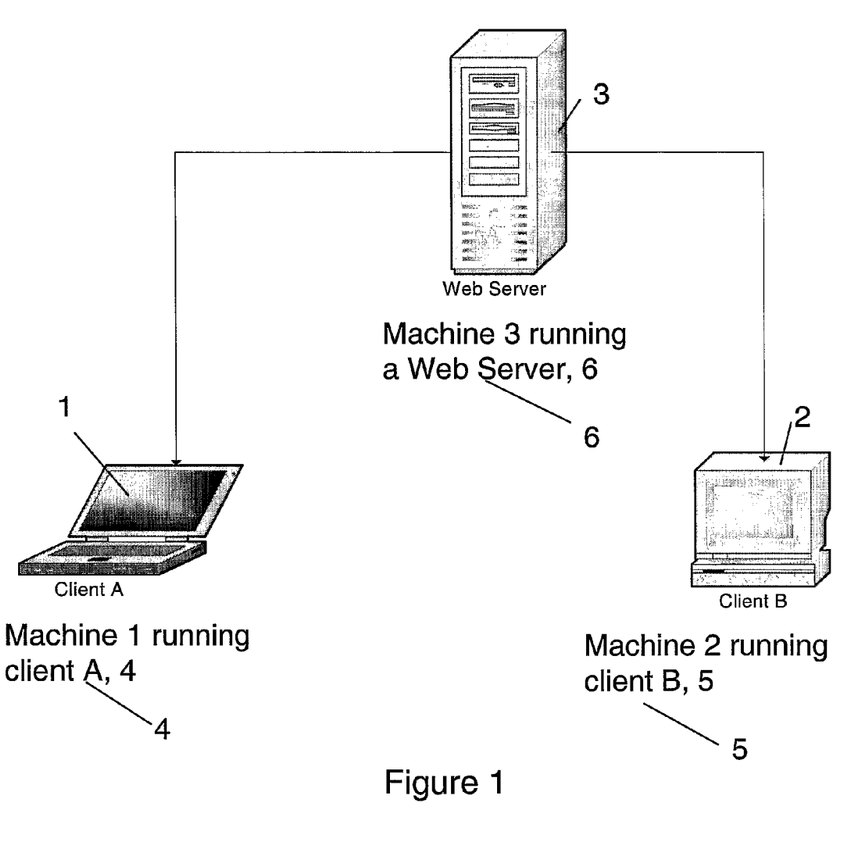
FIG. 1 shows a schematic block diagram of a system for sharing data provided by a server process of an industrial control system, according to an embodiment of the invention.

FIG. 1 shows two user machines, 1, 2 with a connection to a third machine 3 running a process for a web server 6. Machine 1 runs a first client, client A, and machine 2 runs a second client, client B. Each client may run a program that listens on a specific port for commands sent from the web server. Once a message from the web server is received, it is recognised and processed, it may for example be parsed, and the message then acted upon according to the command sent.

A user sets-up for a session by intialising. Information sharing may be initialised by a first client (Client A) requesting a share session with one or more other users, eg Client B. Client A then delegates privileges to client B by specifying privileges in, for example, an input box or field of a GUI (graphic user interface) display. These can for example be read/write or only read privileges, or more complicated privileges stating that client B cannot perform certain tasks (like turning off an engine, switching a power load from one busbar or line to another). A request is sent from the web server to client B notifying client B of a DS session. Client B can then choose whether or not to accept this.

When information is to be shared the technical requirements for the second user may be shown by an indicator in one or more of the documents, as described in d) above to signal that an HTML, IMode, WDL, WSL or other technical format or specification is required for the second user machine, and alternatively or as well, such an indicator may be retrieved from a database comprising information about the technical specification of each user machine.

Figure 2:
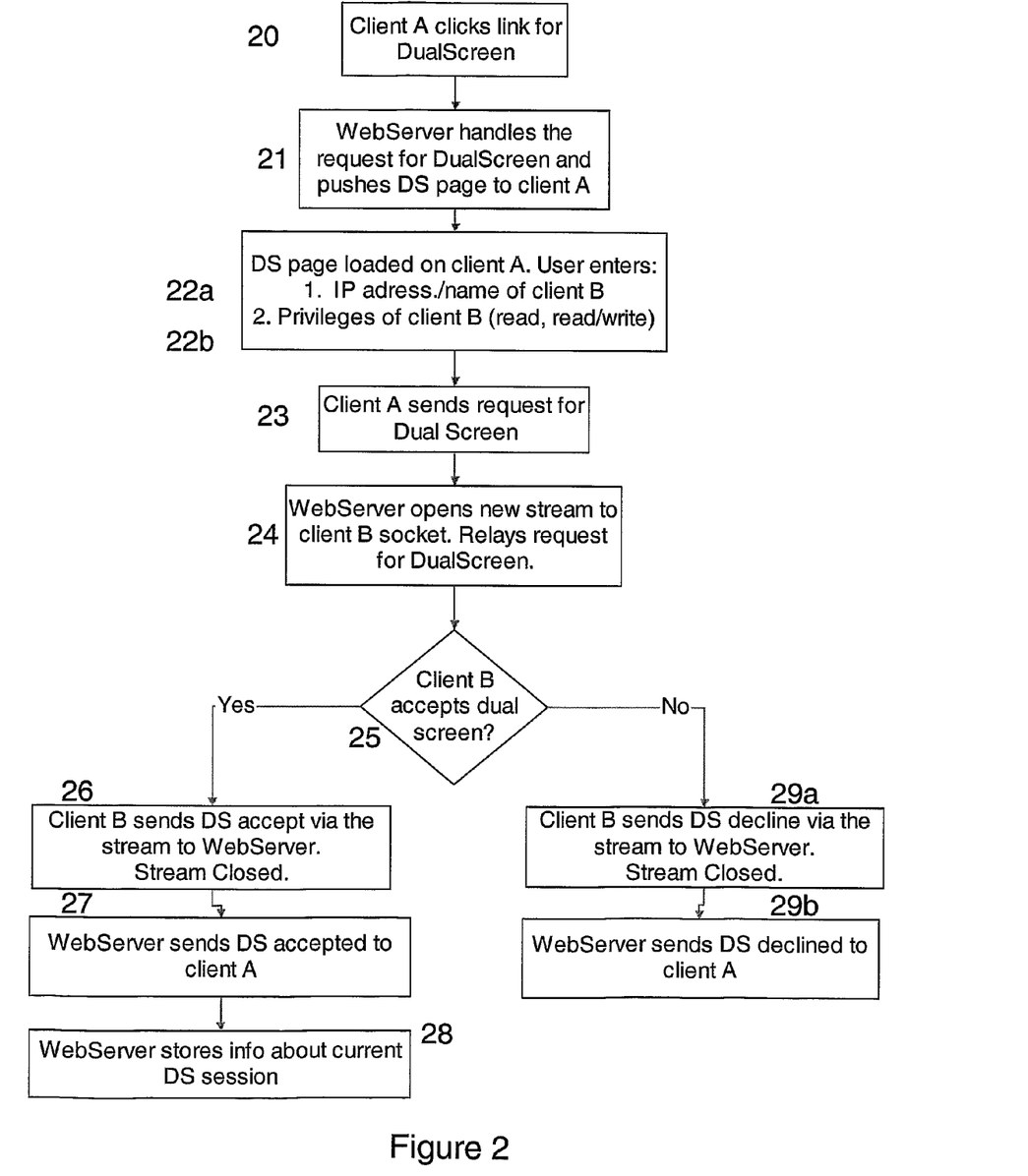
FIG. 2 shows a schematic flowchart for a method according to an embodiment of the invention.

FIG. 2 shows a flowchart for actions that may be carried out by a method according to an embodiment of the present invention. As shown in the flowchart the method may comprise actions such as:
20 first user activates first client A to request a share set-up;
21 web server 6 handles request and pushes a share page to client A;
22a share page loaded on client A;
22b first user enters IP address/name/other ID of client B;
22c first user enters privileges of client B, read, read/write, and/or more control or technical privileges
23 client A sends request as configured (22) for share screen;
24 web server opens new channel or stream to client B or socket for client B, communicates request for share screen;
25Y client B user accepts Y the share screen, then
26 client B sends share screen accept to the web server;
27 web server sends share screen acceptance to client A;
28b server stores information about the current shared session; alternatively,
25N at client B user declines N the share screen, then
29a client B send share decline to the web server;
29b web server sends share decline to client A.

Ordinarily a user, an operator, technician, engineer or other user inputs the identity, the IP address etc to identify one or more other users to share the current process with. However, this data may also or alternatively be supplied by a process running on a computer or processor. Information may also or instead be retrieved from the database described above containing details of the technical requirements of each user that may log-on to the system internally and/or externally.

For each request that comes in to the server or web server, a check is carried out to see whether is comes from a client presently involved in a sharing session. If so, all such clients participating in the session are sent the new information via a stream to their listening socket. The information may be detected by a routine, a program or an agent or watchdog that, for example, listens on a specific port for certain commands sent from the web server.

Figure 3:
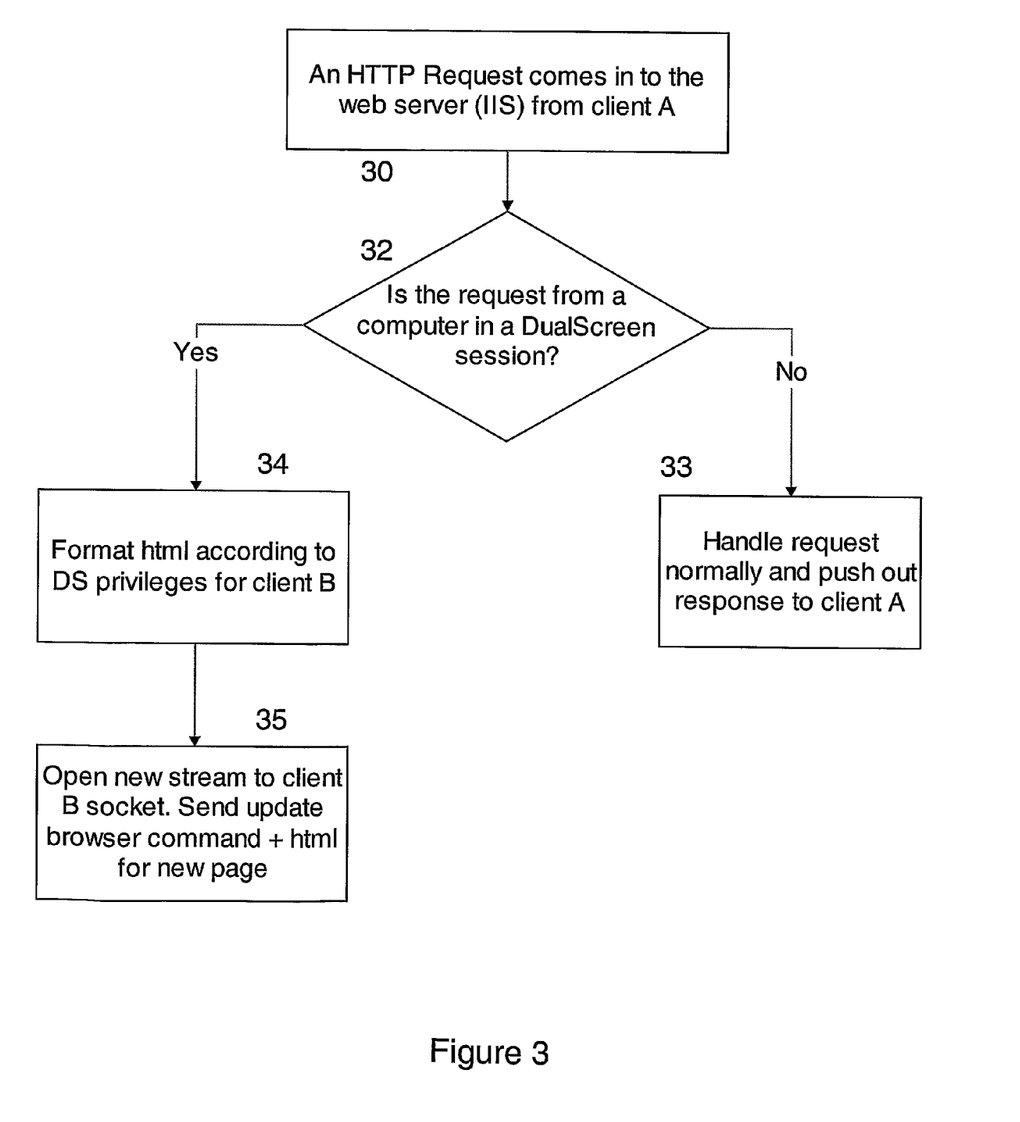
FIG. 3 shows a schematic flowchart for a method according to another embodiment of the invention.

FIG. 3 shows a flowchart for a development of the present embodiment. As shown in the flowchart the method may comprise actions such as:
30 the web server receives a http request from client A;
32Y the http request is from a process or machine in a current share screen session;
34 the web server formats documents of the current share session according to the privileges and technical specification known for client B;
35 web server opens new channel or stream to client B or client B socket, sends update command and metadata or structured text format for new page;
alternatively,
32N the http request is not from a process or machine in a share screen session;
33 the request is handled normally and a response is pushed out or otherwise sent to client A.

The methods of the invention may be carried out remotely using a server application and a thin client A, B such as a web browser software, to provide a graphical user interface on a remote workstation or portable computer, notebook or other computing device. For example a technician may use a PDA (Personal Digital Assistant) or even a mobile phone enabled with applications to handle HTML, or similar or equivalent thin clients. Machines such as 1, 2 which may have different display features and technical limitations may be recognised or identified by use of a more specific format or technical specification than HTML, such as WAP or WDSL or IMode or similar or by formatting comprised in an HTML, XML, XSSL structured text or metadata format. Identification may also or as well be carried out as described above by retrieving an indicator for technical requirements from a database with details of the technical requirements for each known user machine that may be logged on to the system.

Figure 4:
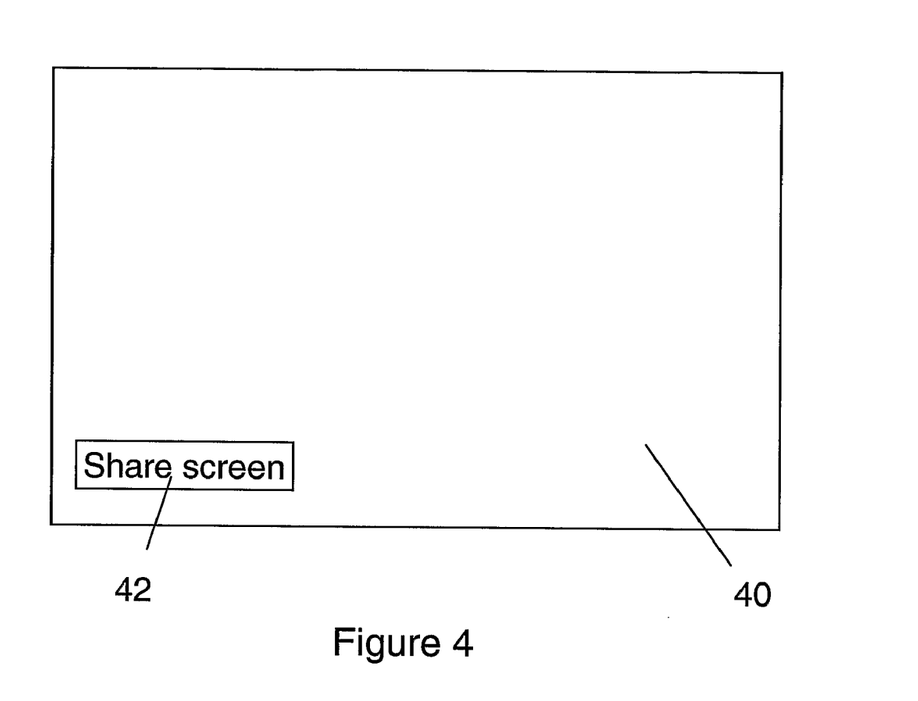
FIG. 4 shows a schematic display and selection means according to another embodiment of the invention.

FIG. 4 shows schematically a screen display 40 of a user machine such as user machines 1, 2. A button 42 or icon or other graphic symbol is displayed for the user to select in order to activate screen sharing, as indicated in step 20 of FIG. 20. This could instead be carried out by inputting text in a text field or command line if required.

Figure 5:
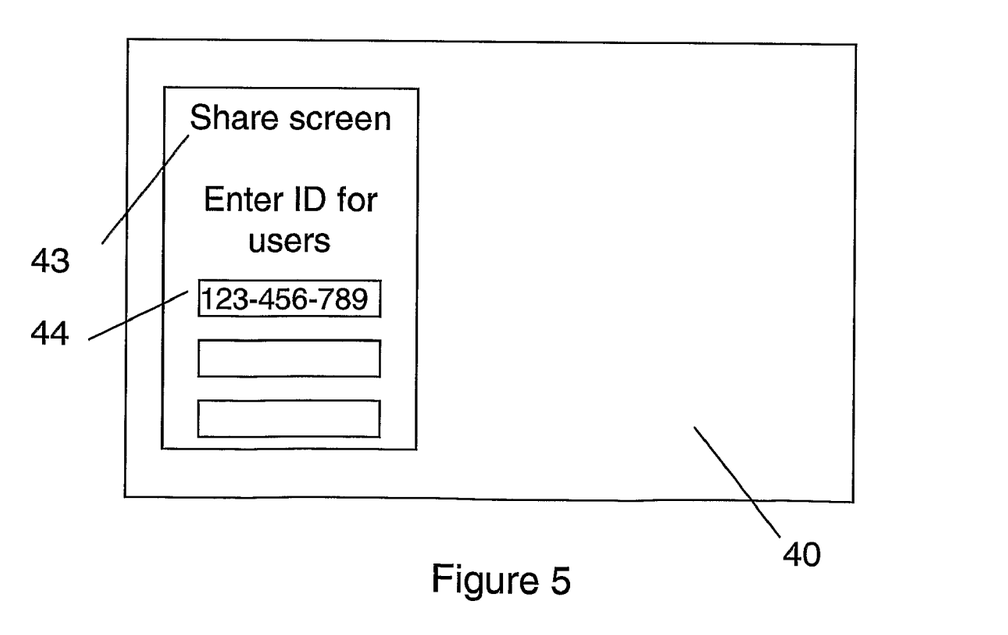

FIG. 5 shows schematically the screen display with which the user can select which other users or experts he/she wishes to share information with. The figure shows a graphic object 43 that prompts the user to identify which second user or other second users are to be specified, and an input field 44 where an IP address or other means to identify a second user may be input. This input field may point to a database of known users and their technical requirements from which address and/or other user information may be retrieved.

Figure 6:
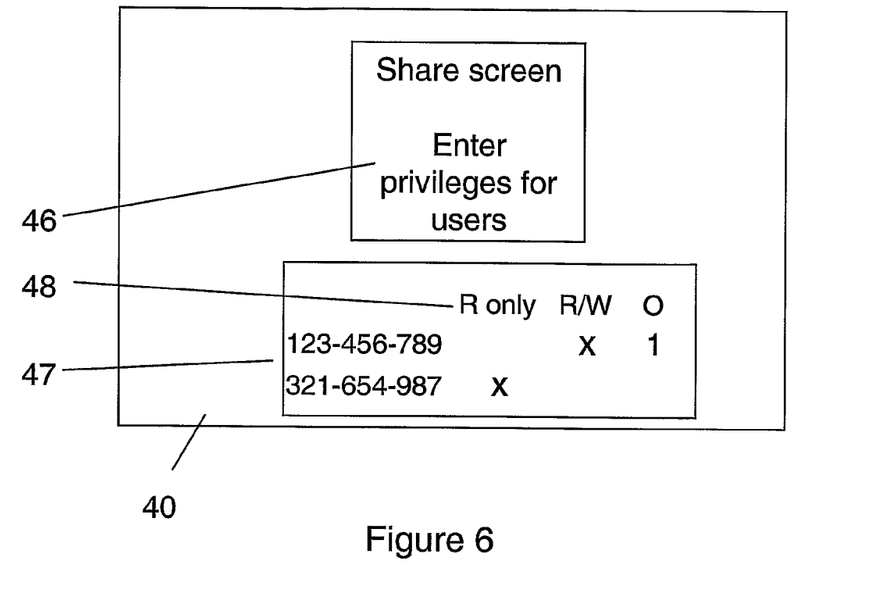
FIG. 6 shows a schematic display with means to allocate privileges for another user or users that will share screens.

FIG. 6 shows an exemplary display with which one or more privileges may be set for the user or users that the first user will share with. The figure shows a graphic object 46 that prompts the user to identify which access privileges the second user or and other second users are to be given. Each user is identified 47 in some way, and the privileges to be assigned 48 are arranged. These privileges may comprise rights to Read Only (R only) Read and/or write (R/W) and Other. Other privileges which may me an authority or technical authority indicated schematically by the column headed O (Other) may be registered in the sharing assigned to each other user, privileges that may be dependent on which functions are present in the industrial control or process control system or part thereof currently selected and/or displayed. For example rights to change a set point may be represented by a 1 (number 1), rights to start data logging by a number such as 3, rights to start a diagnosis of data recorded for maintenance 2 and so on, to comprise other rights such as to switch off an alarm, to start a specified motor, to stop a motor, to switch a circuit breaker on or off, to change a voltage setting of a tap changer, and so on. Activation functions refers to functions in the web page or web client GUI display displayed eg by machines 1, 2 running a client A, or B may carried out by executable applications or applets which may be implemented as Java™ applets or ActiveX™ tools or similar.

Communication between server 3 running web server 6 may be established with other machines 1, 2 by wire and/or wirelessly. A machine with a client for interaction with a web server may for example be connected to a node of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A standard compatible with WAPI (WLAN Authentication and Privacy Infrastructure, GB15629.11-

2003 or later) may advantageously be used in situations where encryption of the wireless signal is necessary or advantageous. A radio technology working in the ISM band with significant interference suppression means such as by spread spectrum technology may be preferred. For example a protocol from ABB called Wireless interface for sensors and actuators (Wisa). Wireless communication may also or alternatively be carried out at least in part using Infra Red (IR) means and protocols such as IrDA, IrCOMM or similar.

Figure 7:
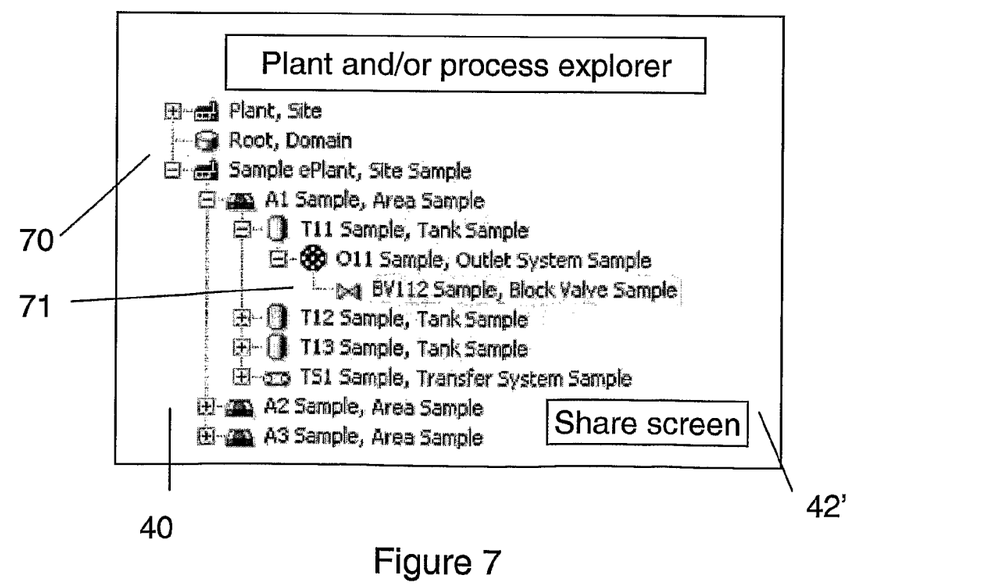
FIG. 7 shows a schematic display with means to request technical assistance for a device, process or system in an industrial installation, according to another embodiment of the invention.

By means of the data made available in an appropriate format to satisfy technical user machine requirements a technician, engineer, operator or other user may examine status or data for a process, configure a parameter, change a set points and/or remotely issue commands to an industrial control unit controlling an industrial equipment or process. The methods of the embodiments described above in respect of FIGS. 1-6 and elsewhere in this specification may be carried out by a one or more computer applications comprising computer program elements or software code which, when loaded in a processor or computer, causes the computer or processor to carry out the method steps. FIG. 7 shows another preferred embodiment of the invention. The user, who is normally logged in to a data network and/or control system in the industrial installation may require technical assistance for a process or device. This may be to supervise or adjust normal production/operations or may be for maintenance purposes or repair/troubleshooting purposes and so on. When the user browses technical, status or specification information associated with a given device or process, a button or icon or other activation function is displayed so that the user can request technical assistance. FIG. 7 shows a display 40, a plant with a process 70 with an equipment or function 71 of plant/process 70 selected, and a button 42, or other activation function. The user may access technical information through the screen object underlying equipment or function 71. By activating the Share Screen button 42', the user causes a Screen share request screen or box eg FIGS. 5, 6 to be displayed. The user can then input or select an identity of a Help Desk or another technical expert with whom to share the information currently displayed or to be displayed on his/her computer or workstation. Identities of one or more known technical experts or other engineers may also be displayed by activating a request for technical assistance button or function and thereafter entered in as an identity to share the technical information with. Thus with the minimum of steps and minimum of processing power at the local user computer, and with minimum use of bandwidth in the system, the user can re-distribute and thereby share his/her technical data with an expert.

The processor (or processors) comprise a central processing unit CPU performing the steps of the method according to one or more facets of the invention. This is performed with the aid of one or more said computer programs, such as a server application, a client watchdog, an address broker or part of, which are stored at least in part in memory and as such accessible by the one or more processors. The or each processor may be in a workstation, notebook, portable computing device, mobile phone, PDA (portable data assistant) or arranged connected to an industrial control unit or part thereof, or may as well run in a local or central control system in a local or distributed computerised control system. It is to be understood that any of said computer programs may be run on an industrial controller or on one or more general purpose industrial microprocessors or computers instead of one or more specially adapted computers or processors, FPGAs (field programmable gate arrays) or ASICs (application specific integrated circuits) or other devices such as simple programmable logic devices (SPLDs), complex programmable logic devices (CPLDs), field programmable system chips (FPSCs).

The computer program comprises computer program code elements or software code portions that make the computer perform the method using equations, algorithms, data, stored values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, CD-ROM or DVD disk, hard disk, magneto-optical memory storage means, in volatile memory, in flash memory, as firmware, stored on a data server or on one or more arrays of data servers. Other known and suitable media, including removable memory media such as Sony Memory Stick™ and other removable flash memories, hard drives etc. may also be used.

The computer programs described may also be arranged in part as a distributed application capable of running on several different computers or computer systems at more or less the same time. Programs or procedures as well as data such as requests, acceptances, declined offers, or other share screen related information may be made available for retrieval, delivery or, in the case of programs, execution over the Internet. Data may be accessed by means of any of: OPC, OPC servers, an Object Request Broker such as COM, DCOM or CORBA, a web service.

Methods of the invention may also be practised, for example during an equipment installation or maintenance procedure, or during a configuration phase, and during normal production or process operations, locally or remotely by means of a Graphical User Interface (GUI), a graphical or textual or mixed display. Displays such as that exemplified by display 40 of FIGS. 4-7 may be provided by an operator workstation; portable computing device; mobile phone suitably equipped to execute a client application and display an HTML or WAP or WDML or a similar page adapted to the technical requirements of the mobile phone/portable device; PDA and generally running on a user's logged-in computer. The user's logged in computer may be connected direct to an industrial control system or process control system or via a data network. The different users sharing the same process provided by the web server may be in different local, regional or national locations.

It should be noted that while the above describes exemplifying embodiments of the invention, there are several variations and modifications which may be made to the disclosed solution without departing from the scope of the present invention as defined in the appended claims.

The invention claimed is:

1. A method for a first user to obtain technical assistance by displaying data provided by a server process in a server of an industrial control system to a thin client process running on a first machine of the first user to at least one other user, the method comprising:

connecting the first machine of the first user to the server, thereby starting a session, displaying on said first machine said data provided by the server to the first machine, identifying by the first user the at least one other user with which data will be shared or to which data will be distributed, wherein the at least one other user is identified from a list of other users having the technical assistance, designating by the first user privileges of the at least one other user, retrieving an address for at least one other machine of the at least one other user, sending a request by the first user to share with or distribute the data to the at least one other user, opening at the initiation of the first user a channel between the server and said at least one other machine, thereby initiating a shared session, determining whether the at least one other machine will accept the shared session, if the at least one other machine accepts the shared session providing said data from said thin client process running on said first machine to another thin client running on said at least one other machine in accordance with the privileges at least one other user and displaying the data on said at least one other machine utilizing the other thin client, and logging by the server the session with the first machine and said data sent to said first machine, wherein the data is stored in a database of the server, and wherein the data provided to a thin client running on the at least one other machine is provided based on the log and the specified privileges wherein the data is formatted for the thin client of the first user and the thin client of the at least one other user.

2. The method according to claim 1, further comprising:
formatting or re-formatting the data of said client process according to a formatting requirement of the at least one other user or their machine, and
providing the data to the at least one other user in a form compatible with the format required.

3. The method according to claim 1, wherein the designated privileges comprise read/write privileges, the method further comprising:
formatting said data of said client process according to the designated privileges of the at least one other user and then providing said data to the at least one other user.

4. The method according to claim 1, wherein the privileges comprise technical and/or operational authority, the method further comprising:
formatting said data of said client process according to the privileges of the at least one other user, and
providing the data in a form compatible with the format and privileges necessary for the at least one other user.

5. The method according to claim 1, further comprising:
retrieving and/or storing at least part of said data and providing at least part of said data from a first logged session with said first user to the at least one other user or their machine.

6. The method according to claim 5, further comprising:
storing at least part of said data from a session with said client process of said first user in a memory storage unit.

7. The method according to claim 5, further comprising:
retrieving part of said data from a memory storage of an industrial data network arranged for supervision and/or control.

8. The method according to claim 7, further comprising:
receiving the identity for at least one other user and sending an invitation to the or each at least one other user to share said information.

9. The method according to claim 8, further comprising:
receiving an affirmative answer from the at least one other user to share said data from a session with said first user.

10. The method according to claim 1, further comprising:
receiving by an indication or selection of a request to share said data of a current session of said server process and providing to the requestor means to input, select, record or otherwise indicate an identity for at least one other user.

11. The method according to claim 10, further comprising:
a server process receiving a share request from a client of said first user and determining that the client is currently in a shared session.

12. The method according to claim 10, further comprising:
registering an indication by the first user for technical assistance in respect of a device or process identifiable to said industrial control system, and
sending from the server to the first user a computer program for the first user to request a shared session with at least one other user.

13. The method according to claim 12, further comprising:
determining from the identity for at least one other user and/or from the current logged session and/or a stored logged session a document format or formats required by the at least one other user or their user machine.

14. The method according to claim 13, further comprising:
determining that the first machine is currently in a shared session, and
by formatting said data as a document according to the privilege or format for the at least one other user or other machine indicated in the information of a logged session and/or indicated in a database comprising details for technical requirements of each user.

15. The method according to claim 1, further comprising:
opening a new channel for a client of the at least one other user, and
sending to the client of the other user an update command and a format for a document for a new page or pages.

16. The method according to claim 1, further comprising:
providing a status or condition of an industrial device or system by said data shown by a display by a text display and/or a graphical user interface running on any processor-equipped device from the list of: workstation, controller, portable computer, personal digital assistant, mobile phone, mobile computing device.

17. The method according to claim 1, further comprising:
monitoring, maintaining, diagnosing and/or controlling an industrial process or equipment including any from the list of: a chemical or petrochemical process, an oil and/or gas installation, mine equipment, a technical system, industrial process control equipment, industrial production equipment, industrial automation equipment, industrial robot equipment.

18. The method according to claim 17, wherein the industrial process or equipment for any from the list of: electricity generation, electricity transmission, electricity distribution, electricity conversion.

19. A computer program product, comprising:
a non-transitory computer readable medium; and
computer program instructions recorded on the computer readable medium and executable by a processor for a first user to obtain technical assistance by displaying data stored by a server, wherein information about a session with a thin client of the first user to at least one other user utilizing a first machine is stored by said server, the method comprising
connecting the first machine of the first user to the server, thereby starting a session,
displaying on said first machine said data provided by the server to the first machine,
identifying by the first user the at least one other user with which data will be shared or to which data will be distributed, wherein the at least one other user is identified from a list of other users having the technical assistance, designating by the first user privileges of the at least one other user, retrieving an address for at least one other machine of the at least one other user, sending a request by the first user to share with or distribute the data to the at least one other user, opening at the initiation of the first user a channel between the server and said at least one other machine, thereby initiating a shared session, determining whether the at least one other machine will accept the shared session, if the at least one other machine accepts the shared session providing said data from said thin client process running on said first machine to another thin client running on said at least one other machine in accordance with the privileges at least one other user and displaying the data on said at least one other machine utilizing the other thin client, and logging by the server the session with the first machine and said data sent to said first machine, wherein the data is stored in a database of the server, and wherein the data provided to a thin client running on the at least one other machine is provided based on the log and the specified privileges wherein the data is formatted for the thin client of the first user and the thin client of the at least one other user.

20. A graphical user interface for a first user to obtain technical assistance by displaying data provided by a server process on a server of an industrial control system to a thin client process running on a first machine of the first user to at least one other user, which session is logged by said server process, the graphical user interface comprising:

a GUI member displayed on a display of the first machine, the GUI member comprising a text function or graphical user interface elements displayed on the display and receiving input from the first user for activating with the first machine a sharing action with at least one other machine of at least one other user, the displayed interface elements further receive input from the first user for identifying the at least one other user from a list of users having the technical assistance and for designating privileges of the at least one other user, wherein the sharing action comprises retrieving an address for at least one other machine of the at least one other user, opening a channel between the server and said at least one other machine, providing said data from said thin client process running on said first machine to another thin client running on said at least one other machine in accordance with the privileges at least one other user and displaying the data on said at least one other machine utilizing another thin client running on the second machine.

21. The graphical user interface according to claim 20, further comprising:

a text function or GUI function for configuring an identity of a second user with whom or which to share said information.

22. The graphical user interface according to claim 21, wherein the privileges comprise read and/or write privileges, and wherein the text function or GUI function for configuring the at least one other user to share said data comprises graphic or text procedures to specify the read or read/write privileges for the at least one other user.

23. The graphical user interface according to claim 21, wherein the privileges comprise technical authority or privileges, and wherein the text means or GUI member for configuring the at least one other user to share said data comprises a graphic or text procedure to specify the technical authority or privileges for the at least one other user.

24. A system for a first user to obtain technical assistance by displaying data provided by a server process in a server of an industrial control system to a thin client process running on a first machine of the first user to at least one other user, the system comprising:

a server and a first machine; and at least one application which may be a server process which application is additionally arranged with one or more programs or procedures running in the server or the first machine for connecting the first machine of the first user to the server, thereby starting a session, displaying on said first machine said data provided by the server to the first machine, identifying by the first user the at least one other user with which data will be shared or to which data will be distributed, wherein the at least one other user is identified from a list of other users having the technical assistance, designating by the first user privileges of the at least one other user, retrieving an address for at least one other machine of the at least one other user, sending a request by the first user to share with or distribute the data to the at least one other user, opening at the initiation of the first user a channel between the server and said at least one other machine, thereby initiating a shared session, determining whether the at least one other machine will accept the shared session, if the at least one other machine accepts the shared session providing said data from said thin client process running on said first machine to another thin client running on said at least one other machine in accordance with the privileges at least one other user and displaying the data on said at least one other machine utilizing the other thin client, and logging by the server the session with the first machine and said data sent to said first machine, wherein the data is stored in a database of the server, and wherein the data provided to a thin client running on the at least one other machine is provided based on the log and the specified privileges wherein the data is formatted for the thin client of the first user and the thin client of the at least one other user.

25. The system according to claim 24, wherein the server application is arranged to provide, on request, at least part of said data from the logged session of said first user to at least one other user.

26. The system according to claim 24, further comprising:

two or more client applications each comprising a function for recognizing a communication from a server or web server about sharing stored data.

27. The system according to claim 24, further comprising:

document format data and procedures for formatting or re-formatting said data to any of a plurality of document display formats suitable for display on any of a plurality of different types of computer-equipped devices.

28. A software application recorded on a non-transitory computer readable medium for a first user to obtain technical assistance by displaying data provided by a server process in a server of an industrial control system to a thin client process running on a first machine of the first user to at least one other user, the application comprising procedures to:
- connecting the first machine of the first user to the server, thereby starting a session,
- displaying on said first machine said data provided by the server to the first machine,
- identifying by the first user at least one other user with which data will be shared or to which data will be distributed, wherein the at least one other user is identified from a list of other users having the technical assistance,
- designating by the first user privileges of the at least one other user,
- retrieve an address for at least one other machine of the at least one other user,
- send a request by the first user to share with or distribute the data to the at least one other user,
- at the initiation of the first user cause a channel to be opened between the server and said at least one other machine thereby initiating a shared session,
- determining whether the at least one other machine will accept the shared session,
- if the at least one other machine accepts the shared session providing said data from said thin client process running on said first machine to another thin client running on said at least one other machine in accordance with the privileges at least one other user and displaying the data on said at least one other machine utilizing the other thin client, and
- log by the server the session with the first machine and said data sent to said first machine, wherein the data is stored in a database of the server, wherein the data provided to a thin client running on the at least one other machine is provided based on the log and the specified privileges, and wherein the data is formatted for the thin client of the first user and the thin client of the at least one other user.

29. The software application according to claim 28, further comprising procedures to:
- determine that said first user has selected a requirement to distribute and share with at least one other user, and
- retrieve an address for the at least one other user dependent on an identity for the at least one other user indicated by said first user.

30. The software application according to claim 28, further comprising procedures to:
- format or re-format said data of said client process according to a format requirements of the at least one other user and/or their machine.

31. The software application according to claim 28, further comprising procedures to:
- retrieve and/or store at least part of said data and provide at least part of said data from a first logged session with said first user to the at least one other user and/or their machine.

32. The software application according to claim 28, further comprising running one or more procedures on a real or virtual machine running on any of a: node, gateway, hub, router, data server.

33. The software application according to claim 28, wherein a program executing locally runs one or more procedures on a real or virtual machine running on a machine of the at least one other user.

34. The software application according to claim 28, further comprising procedures to:
- provide, on request, a text display or a graphical user interface or other means for recording a requirement of said first user to distribute or share the formatted data of said client process with at least one other user.

35. The software application according to claim 28, further comprising one or more procedures to:
- record an identity and/or address for the indicated at least one other user.

36. The software application according to claim 28, further comprising one or more procedures to:
- record privileges of the at least one other user.

37. An industrial control system for a first user to obtain technical assistance by displaying data provided by a server process of a server of said industrial control system to a thin client process running on a first machine of the first user to at least one other user, which session is logged by said server process, the system comprising:
- at least one application which may be a server process which application is additionally arranged with one or more programs or procedures for determining that said first user makes a selection to distribute or share said data of said client process with at least one other user, for first user to identify the at least one other user, for designating by the first user privileges of the at least one other user from a list of other users having the technical assistance, for retrieving an address for at least one other machine of the at least one other user, for sending a request by the first user to share or distribute data to the at least one other user, for opening at the initiation of the first user a channel between the server and said at least one other machine, thereby initiating a shared session, determining whether the at least one other machine will accept the shared session, and if the at least one other machine accepts the shared session providing said data from said thin client process running on said first machine of said first user to another thin client running on at least one other machine of at least one other user utilizing the other thin client, logging by the server the session with the first machine and said data sent to said first machine, wherein the data is stored in a database of the server, and wherein the data provided to a thin client running on the at least one other machine is provided based on the log and the specified privileges, wherein the data is formatted for the thin client of the first user and the thin client of the at least one other user, and
- at least one second user machine comprising a display on which text and/or graphics of a client process may be displayed.

* * * * *